United States Patent [19]

White

[11] 4,178,953
[45] * Dec. 18, 1979

[54] FAIL SAFE BYPASS VALVE

[75] Inventor: Jack M. White, Florissant, Mo.

[73] Assignee: ACF Industries, Incorporated, New York, N.Y.

[*] Notice: The portion of the term of this patent subsequent to Dec. 18, 1995, has been disclaimed.

[21] Appl. No.: 535,955

[22] Filed: Dec. 23, 1974

[51] Int. Cl.² ............................................. F02B 75/10
[52] U.S. Cl. ........................................ 137/116; 60/290
[58] Field of Search ............... 137/115, 513, 116, 117; 60/290

[56] References Cited

U.S. PATENT DOCUMENTS

| | | | |
|---|---|---|---|
| 2,391,551 | 12/1945 | Cruzan et al. | 137/116 |
| 3,106,820 | 10/1963 | Schaffer et al. | 60/290 |
| 3,143,135 | 8/1964 | Cornelius | 137/517 |
| 3,430,437 | 3/1969 | Saussele et al. | 60/290 |
| 3,479,816 | 11/1969 | Masters | 60/290 |
| 3,520,320 | 7/1970 | Crawford et al. | 137/115 |
| 3,616,811 | 11/1971 | Shimosaki | 137/115 |
| 3,919,843 | 11/1975 | Arnaud et al. | 60/290 |
| 3,964,259 | 6/1976 | Fitzgerald | 60/290 |
| 3,964,515 | 6/1976 | May | 60/290 |

Primary Examiner—William R. Cline
Assistant Examiner—H. Jay Spiegel
Attorney, Agent, or Firm—Edward H. Casey

[57] ABSTRACT

A diaphragm operated valve includes a valve body having inlet, outlet and bypass ports in it. A diaphragm assembly includes a flexible diaphragm and a valve stem. The valve stem has a main valve member attached to it which is movable with the diaphragm assembly. The diaphragm is flexibly responsive to negative pressure which regulates main valve member operation. The valve includes a fail safe feature which shuts the main valve passage upon loss of negative pressure. The diaphragm assembly and main valve function to regulate air output from the valve. A second pressure relief valve member is carried by, but operates independently of the valve stem. Means for limiting air output of the main valve during high air input conditions is carried on the pressure relief side of the valve and operates whenever the pressure relief valve is activated so as to aid in the closure of the main valve passage.

6 Claims, 2 Drawing Figures

FAIL SAFE BYPASS VALVE

BACKGROUND OF THE INVENTION

This invention relates to bypass pressure relief valves and in particular to relief valves finding application in exhaust systems for internal combustion engines. While the invention is described in particular detail with respect to such systems, those skilled in the art will recognize the wider applicability of the inventive concept disclosed hereinafter.

A number of approaches for reducing pollution of the atmosphere caused by automobile internal combustion engines recently have been investigated. One system apparently finding favor injects air obtained from an air pump, which commonly is driven by the crankshaft of the internal combustion engine, into the exhaust system of the engine. Air injected in the exhaust system aids further combustion of the gases expelled from the exhaust valves of the engine, providing additional burning before expulsion of the exhaust gases to the atmosphere. Further reduction of air pollutants expelled by the engine can be obtained by cycling the exhaust gases through a catalytic converter.

The systems utilizing air pumps to support further combustion in the exhaust system in conjunction with catalytic converters present certain difficulties heretofore unresolved in the art. For example, the converters are relatively expensive and can be damaged by excessive heat in the exhaust gases. Consequently, some means for reliably protecting the catalytic converter while simultaneously permitting combustion of the exhaust gases is necessary or various malfunctions to one or more vehicle components may cause damage to otherwise unrelated components of the exhaust system. The catalytic converter especially is sensitive to heat damage which may result if excessive air is inserted into the exhaust system during certain operating periods of the vehicle.

Diaphragm actuated bypass and relief valves are known in the art. For example, the U.S. Patent to Crawford et al, U.S. Pat. No. 3,520,320, issued July 14, 1970, describes one such valve. Fail safe devices also are known in the art. For example, the copending U.S. patent application to Crawford, Ser. No. 535,957, filed Dec. 23, 1974 discloses one particular bypass valve form incorporating fail safe features.

In general, prior art valves are intended to function with an air pump commonly driven by the crankshaft of the internal combustion engine by a belt or other mechanical interconnection. The valve is positioned in a line connected between the air pump and the exhaust system. Means are provided for sensing engine manifold vacuum pressure and for controlling main air input to the exhaust system based on manifold pressure. Most air pumps used for this purpose are a positive displacement type. Being positive displacement types, air pump output increases with engine speed. This higher air output generally is not required for proper combustion of the exhaust gases in the exhaust system. The prior art devices indicated above include devices that regulate the air input to the exhaust system by limiting movement of the main valve member to a predetermined distance so that the opened position of the main valve member corresponds to a known input air valve. Excess air is vented to the atmosphere through a pressure relief valve. While these prior art devices worked well for their intended purposes, damage to catalytic converters caused by excessive heat also can result merely by prolonged high speed operation of the vehicle, in the absence of other factors.

My invention prevents damage to the catalytic converter even during prolonged high speed operation, for example, by providing means for closing the main air valve member controlling air input to the exhaust system which operates whenever the pressure relief valve member is actuated. This construction also reduces cost of the valve because using the bypassed air as an aid in closing the main valve lowers the biasing requirement provided by the main valve member spring. Consequently, lower cost spring constructions compatible with the valve of this invention cannot be used with prior art valve designs.

One of the objects of this invention is to provide a bypass pressure relief valve for an internal combustion engine having fail safe features upon loss of engine manifold pressure.

Another object of this invention is to provide a bypass and relief valve incorporating means for closing the main diaphragm actuated valve member under certain predetermined conditions of high air supply.

Another object of this invention is to provide a valve having two operational valve members and dual means for closing one of the operational valve members, all operated in conjunction with a single valve stem.

Other objects of this invention will become apparent to those skilled in the art in light of the following description and accompanying drawing.

SUMMARY OF THE INVENTION

In accordance with this invention, generally stated, a three ported valve is configured to provide shut off of the main passage upon sensing a predetermined condition. The valve includes a diaphragm actuated main valve member and a positive opening pressure relief valve member operable independently of the diaphragm valve. Means responsive to relief valve member operation is provided which acts to close the main valve member whenever the pressure relief valve member is actuated.

DESCRIPTION OF THE PREFERRED EMBODIMENT

Figure 1:
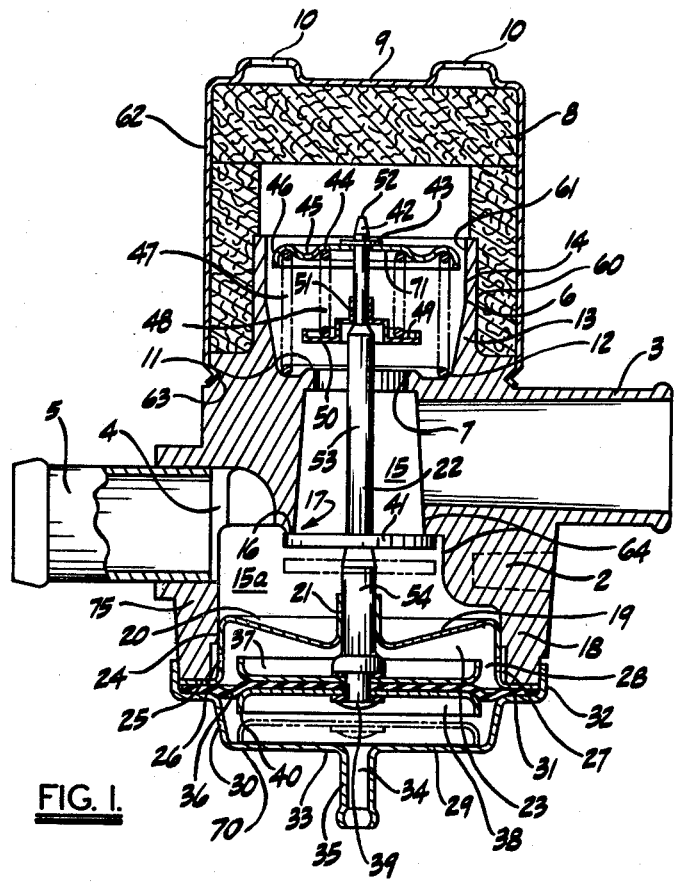
FIg. 1 is a view in side elevation, partly in section and partly broken away, of valve of this invention in a first operating position.

Referring now to FIG. 1, reference numeral 1 indicates the valve of this invention. The valve 1 is provided with a main body protion 2 which conveniently is of die cast construction. Body 2 has an inlet connection 3 integrally formed with it, and has an outlet opening 4 sized to receive an outlet connection 5 in a press fit. Either of the inlet 3 or outlet 5 may be integrally constructed with the body portion 2, if desired, or they may be manufactured separately and later interconnected to the body portion 2 by any convenient method. Brazing or the above-mentioned slip fit work well as connection methods, for example.

The body portion 2 is provided with an upper skirt 6 which defines a bypass port 7. Skirt 6 also provides means for attaching a muffler element 8 to the body portion 2. Muffler 8 may be of any construction suitable to reduce the audible noise resulting from the passage of air through a valve. A felted muffler composed of shreaded or fibrous material has been found satisfactory. The muffler 8 includes a side wall 62 and a top wall 9 having a plurality of raised openings 10 in it, serving as an escape for air passing through the bypass port 7. The side wall 62 is crimped or pressed into a groove 63 in body portion 2 to attach the muffler 8 to the body portion.

As viewed in the drawings, skirt 6 has a substantially vertical outer wall 60 and an inner wall 61 which defines a seat 11 surrounding the port 7, a spring retaining area 12 outboard of the port 7, and a canted part 13 extending between the radially outward boundary of the spring retaining area 12 and a substantially vertical portion 14 which, with the wall 60, delimits the upper end of the skirt 6, as viewed in FIG. 1. The particular construction of the interior wall 61 is important in the operation of the valve 1, as fully explained hereinafter.

The inlet connector 3 opens into an interior chamber 15 which communicates with the outlet opening 4 through a chamber 15a. An interior wall 64 of the body portion 2 defines a main valve seat 16 surrounding a main valve port 17, between the chambers 15 and 15a.

A lower part 75 of the body portion 2 defines a rim 18 which, together with structure discussed hereinafter, define the chamber 15a. The chamber 15a is closed along a lower open end of the rim 18 by a cup 19. The cup 19 is press fit or otherwise seated within the rim 18. Cup 19 is annular in plan and includes a top wall 20 which defines a guide bushing 21 along a central portion of the wall 20. Bushing 21 provides radial support for a valve stem 22 of a diaphragm assembly 23 while permitting axial movement of the valve stem, which movement is governed by the flexing of a diaphragm 36. The cup 19 also has a side wall 24 integrally formed with the top wall 20. The side wall 24 extends along the rim 18 and is frictionally engaged by it in the intermounted position of the cup 19. Wall 24 has an outwardly extending flange 25 along an end opposite the top wall 20. The side wall 24 also has at least one opening 26 through it, which communicates with an annular channel 27 in the part 75 of the body portion 2. Channel 27 communicates with the atmosphere through an opening in body portion 2, not shown. Consequently, a section 65 of a diaphragm chamber 28 formed by the cup 19 operates at atmospheric pressure. A second section 66 of the diaphragm chamber 28 is defined by an end cap 29.

End cap 29 includes a side wall 30 having a radially outwardly extending diaphragm engaging part 31 and an axially extending part 32 outboard of part 31, which is pressed against the lower end of rim 18 to attach the cap 29 to the valve 1. A bottom wall 33, integrally constructed with the other structural components of the cap 29, defines a stop means 70 for the valve 1. The bottom wall 33 has a central opening 34 defined in part by a tube 35 which extends outwardly from the plane of the wall 33. Tube 35 preferably is integrally constructed with the bottom wall 33, however, the tube 35 may be constructed separately and inserted or attached to the end cap 29 through the opening 34 by any convenient method. Either construction technique is acceptable. The tube 35 is utilized to connect the second section 66 of the diaphragm chamber 28 to a source of negative pressure, not shown.

Diaphragm assembly 23 includes the valve stem 22 and the flexible diaphragm 36. The diaphragm 36 is positioned between a first plate 37 and a second plate 38 of the assembly 23, which in turn are attached to an end 39 of the valve stem 22. The construction of the diaphragm assembly 23 is conventional and is not described in detail. Those skilled in the art will recognize that a variety of construction methods are available for forming the assembly 23. The plate 38 commonly has a turned lip 40 which is important in the operation of the valve 1, as is explained hereinafter. The marginal periphery of the diaphragm 36 is secured between the part 31 of the end cap 29 and the flange 25 of the cup 19 along the lower end of the rim 18, as observable in FIGS. 1 and 2.

Figure 2:
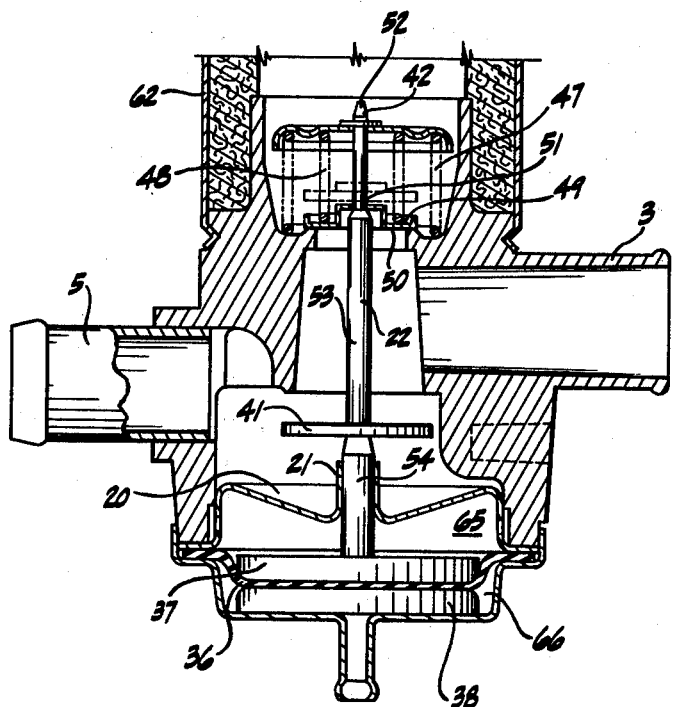
FIG. 2 is a view in side elevation, partly broken away and partly in section, of the valve of FIG. 1, illustratively shown in a second operating position.

A main valve member 41 is mounted to the valve stem 22 by any convenient method, and is movable therewith between at least a first position and second position shown in full and phantom lines respectively in FIG. 1 and represented by the respective positions of the valve member 41 indicated in FIGS. 1 and 2.

A second end 42 of the valve stem 22 has a keeper 43 attached to it, which secures a valve plate 44 to the stem 22. Keeper 43 is conventional and any convenient structure is suitable. A common lock washer, for example, works well, as the keeper 43.

The valve plate 44 generally is circular in plan having a flat central area 71, a rib 45 formed in it outboard of the central area 71, and an outer overturned edge part 46. The area 71 has a central opening in it which is designed to receive the end 42 of the valve stem 22. One end of a spring 47 is positioned in the groove defined by the edge part 46 and the rib 45. A second end of the spring 47 is positioned in the spring retaining area 12 of the body portion 2 so that the spring is compressed between the valve plate 44 and the area 12. The bias force provided by the spring 47 keeps the valve plate 44 in abutment with the keeper 43. Consequently, the spring 47 acts to move the valve stem 22 in an upward direction, referenced to the drawing figures shown.

A second spring 48 is positioned between the valve plate 44 and a bypass valve member 49. The springs 47 and 48 are conventional coil compression springs which are predeterminedly chosen to assist in valve operation, as described below.

Bypass valve member 49 is annular in plan and includes a spring retaining portion 50 and a central hub 51. Hub 51 has an axial opening in it intended to permit passage of a portion of the valve stem 22.

Valve stem 22 generally is a cylindrical structure having three different diametric positions 52, 53, and 54, respectively, arranged in ascending order between an end 42 and the end 39 of the stem 22. Valve members 41 and 49, and valve plate 44 are placed over the stem 22 sequentially from the end 42 side of the stem 22. Openings in the respective valve members are sized so that the respective valve members abut a diametric portion larger than the opening in the valve member, thereby preventing the valve members from traveling the length of the valve stem 22. Other movement restriction methods for holding the valve member 41 in place along the stem 22, in addition to that provided by the larger diametric portion 54 of the stem 22, may be utilized, if desired. As indicated above, the action of the spring 47 keeps the valve plate 44 in abutment with the keeper 43. Valve member 49, however, is free to move against the bias force of the spring 48, from its abutment with diametric portion 53 toward the end 42 of the valve stem 22 independently of valve stem 22 movement.

Simple operation of the valve 1 is provided. Conventionally, the valve 1 is installed in the air line which is connected between an air pump and the exhaust system of an internal combustion engine, for example. Output of the pump is connected to the inlet connector 3 and the exhaust system is connected to the outlet connector 5 of the valve 1. A source of negative pressure is coupled to the tube 35.

The normal operating position of the valve 1 is indicated in FIG. 2. As there shown, a source of negative pressure, which conveniently may be the vacuum present at the engine intake manifold when an internal combustion engine is operating, is sensed and applied to the section 66 of the diaphragm chamber 28 via the tube 35. Application of vacuum or negative pressure to the section 66 creates a pressure differential on opposite side of the diaphragm 36 permitting the atmospheric pressure present in the section 65 to overcome the bias of spring 47 and drive the diaphragm assembly 23 downwardly, as referenced to FIGS. 1 and 2. As the assembly 23 moves downwardly, the plate 38, and in particular, the lip 40 of the plate 38, comes into contact with the stop means 70 of the bottom wall 33, thereby preventing further movement of diaphragm assembly 23. The stop means 70 of the bottom wall 33 thus limits movement of the valve member 41 to a distance equal to the axial height of the side wall 30 of the end cap 29. Downward movement of the diaphragm assembly 23 unseats the valve member 41 from the seat 16, permitting air to pass through the valve 1 along a passage defined by the inlet 3, chambers 15 and 15a, and the outlet 5. The situation depicted in FIG. 2 is the normal operating position of the valve 1, when the internal combustion engine is operating at relatively low speeds.

At high internal combustion engine speeds, for example, at vehicle speeds in the vicinity of 50 mph, an air pump operated by the engine, not shown, conventionally being of positive displacement type, can provide excessive air to the valve 1 such that unchecked air input to the exhaust system may result in damage to any catalytic converter utilized in conjunction with that system. Similar damage may occur at high cruising speeds, if those speeds are maintained over prolonged periods, even where stop means 70, or an equivalent structure, is used to limit air input to the exhaust system. The valve 1 of this invention is designed especially to protect against such damage. Because the diaphragm assembly 23 is restricted in axial movement by the stop means 70 of the bottom wall 33, only a predetermined quantity of the air is permitted through the main valve port 17. Consequently, pressure may build up in the chamber 15. Once the pressure in the chamber 15 builds up sufficiently, it will overcome the bias of the spring 48 and the valve 49 will lift from the seat 11. Air thereafter may exit the valve 1 via the port 7 and the muffler portion 8. The out-rush of air through the port 7 is directed radially outwardly by the valve member 49, against the canted portion 13 of the wall 61. The portion 13 of wall 61 redirects at least a portion of the air out-rush against the valve plate 44. The force of the air striking the valve plate 44 forces the valve plate 44 upwardly and in turn, draws the valve member 41 toward the seat 16, thereby reducing the air volume entering the exhaust system from the valve 1. If the out-rush of air through the valve member port 7 is sufficient, the combined force of the air on the valve plate 44 and the spring 47 will close the valve member 41 against the seat 16. The force from the air out-rush will continue to act to close the valve member 41 until the pressure in the chamber 15 is overcome by the bias provided by the spring 48, permitting the valve member 49 to again close the port 7.

The valve 1 also provides a fail safe feature which will protect exhaust system components in the event vacuum is lost, as for example, when the vacuum connection to the tube 35 is ruptured. In this situation, the pressure in the sections 65 and 66 equalize and the spring 47 drives the valve stem 22 upwardly, sealing the valve member 41 against the seat 16. The diaphragm assembly 23 is incapable of overcoming the bias of spring 47 until vacuum is reapplied to the tube 35. Pressure build up in the chamber 15 would again unseat the valve member 49 permitting air exit along the port 7, muffler portion 8 path.

It is thus evident that a simply constructed, fail safe valve is provided meeting all of the ends and objects of the invention.

Numerous variations, within the scope of the appended claims, will be apparent to those skilled in the art in light of the foregoing description and accompanying drawings. Thus, the silhouette of the valve 1 may be varied in other embodiments of this invention. While the valve body 2 is described as a cast metal portion, other embodiments in the valve 1 may be constructed entirely from sheet metal. Other designs for the valve members 41 and 41a, and the valve plate 44 are compatible with the broader aspects of this invention. Means other than the canted portion 13 of the wall 61 may be used for directing air against the valve plate 44. These variations are merely illustrative.

Having thus described the invention, what is claimed and desired to be secured by Letters Patent is:

1. A valve structure comprising:
   a valve body having inlet and outlet openings and main and by-pass ports in said valve body, said valve body having a passage between said inlet opening, said main valve port, said by-pass port and said outlet opening;
   a diaphragm chamber structure mounted to said valve body;
   a source of engine vacuum connected to said chamber;
   a diaphragm assembly mounted in said diaphragm chamber structure, said diaphragm assembly including a valve stem having a first end and a second end, and a flexible diaphragm mounted to said second end of said valve stem, said diaphragm being flexible in response to variations in said engine vacuum forces acting on it so as to define at least a first position and a second position for said valve stem and wherein a low vacuum will permit said first position and a high vacuum will urge said diaphragm to said second position;
   a first valve member fixed to said valve stem and adapted to close said main outlet port in said first position of said valve stem;
   a second valve member of a diameter substantially equal to said by-pass port for engaging said by-pass port and movably mounted on said valve stem, movement of said second valve member being independent of said valve stem movement;
   means operatively connected along said first end of said valve stem for biasing said second valve member against said by-pass port, and means for biasing said diaphragm assembly toward the first position of said valve stem, said valve body including a skirt defining said by-pass port and said diaphragm assembly biasing means including a substantially circular valve plate operatively connected to said first end of said valve stem and movable with said valve stem within the space enclosed by said skirt, said plate having a diameter substantially greater than said second valve member and defining a flow restriction with said skirt, said skirt having a canted interior wall by which air passing through said by-pass port is directed at said valve plate to strike said valve plate whereby the force of air striking said valve plate urges said valve stem toward its first said position and increasing air flow will overcome said vacuum to move said valve stem entirely to said second position.

2. The valve structure of claim 1 wherein said second valve member biasing means includes a spring biased between said valve plate and said second valve member.

3. In a valve including a valve body having main and by-pass valve ports, a diaphragm assembly including a flexible diaphragm, a valve stem having first and second ends, said second end being operatively connected to said diaphragm, said diaphragm assembly being mounted to said body so as to permit movement of said valve stem between at least first and second positions in response to changes in engine vacuum acting on said diaphragm, a first valve member mounted to said valve stem and adapted to close said main valve port in said first position of said stem, and a second valve member of a diameter substantially equal to said by-pass port for engaging said by-pass port and mounted to said valve stem but movable independently thereof, the improvement comprising means for exerting a force on said diaphragm assembly so as to move said first valve member in a direction to close said main valve port, said force exerting means comprising a substantially circular valve plate mounted to the first end of said valve stem and positioned to intercept air passing through said by-pass port, said plate having a diameter substantially greater than said second valve member, said valve body including a skirt defining said by-pass port and also defining a flow restriction with said plate, said skirt having a canted interior wall by which air passing through said by-pass port is directed at said valve plate to strike said valve plate whereby the force of air striking said valve plate overcomes said engine vacuum and urges said diaphragm assembly towards said closed position of said main valve port.

4. The improvement of claim 3 further characterized by diaphragm chamber structure means mounted to said valve, said diaphragm chamber structure means including a first section and a second section having said flexible diaphragm mounted therebetween, said second section including means for limiting movement of said diaphragm assembly as said diaphragm moves said valve stem from said first position to said second position.

5. The improvement of claim 3 further characterized by means for biasing said by-pass valve member against said by-pass port, said last-mentioned means comprising a spring biased between said valve plate and said by-pass valve member.

6. The improvement of claim 3 wherein said valve stem comprises a cylindrical structure having thee diametric portions arranged in ascending diametric order, said by-pass valve member being positioned between said first and said second diametric portions and said main valve member being positioned between said second and said third diametric portions.

* * * * *